(12) United States Patent
Hensen et al.

(10) Patent No.: US 8,282,401 B2
(45) Date of Patent: Oct. 9, 2012

(54) ELECTRIC MULTIPLE DISTRIBUTOR

(75) Inventors: Hans-Joachim Hensen, Lemgo (DE); Cord Starke, Blomberg (DE); Michael Wimmer, Kremmen (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 0 days.

(21) Appl. No.: 13/130,580

(22) PCT Filed: Nov. 25, 2009

(86) PCT No.: PCT/EP2009/008385
§ 371 (c)(1),
(2), (4) Date: Aug. 15, 2011

(87) PCT Pub. No.: WO2010/060608
PCT Pub. Date: Jun. 3, 2010

(65) Prior Publication Data
US 2011/0287659 A1    Nov. 24, 2011

(30) Foreign Application Priority Data
Nov. 28, 2008   (DE) .......................... 10 2008 059 477

(51) Int. Cl.
*H01R 12/00*  (2006.01)
(52) U.S. Cl. ...................................... 439/76.1
(58) Field of Classification Search ............... 439/76.1, 439/76.2, 607.41, 607.46–607.52, 498, 949, 439/581, 488; 361/752
See application file for complete search history.

(56) References Cited

U.S. PATENT DOCUMENTS

| 187,397 A | 8/1932 | Watts |
| 3,676,744 A | 7/1972 | Pennypacker |
| 3,728,666 A | 4/1973 | Shirey |
| 4,015,070 A * | 3/1977 | Theurer ........................ 174/535 |
| 5,115,105 A | 5/1992 | Gallusser et al. |
| 5,618,186 A * | 4/1997 | Saka et al. .................... 439/76.2 |
| 6,165,009 A | 12/2000 | Anbo et al. |
| 6,362,970 B1 * | 3/2002 | Hinzpeter et al. ............ 361/752 |
| 6,409,530 B1 | 6/2002 | Zhao et al. |
| 6,790,050 B1 | 9/2004 | Roth-Stielow et al. |
| 7,151,225 B2 * | 12/2006 | Fujikami .................... 174/125.1 |

FOREIGN PATENT DOCUMENTS

| DE | 8912226 U1 | 11/1989 |
| DE | 3822573 A1 | 1/1990 |
| DE | 9418719 U1 | 3/1996 |
| DE | 19905952 A1 | 9/2000 |
| EP | 0448230 A2 | 9/1991 |
| GB | 2274209 A | 7/1994 |

* cited by examiner

*Primary Examiner* — Edwin A. Leon
*Assistant Examiner* — Harshad Patel
(74) *Attorney, Agent, or Firm* — Leydig, Voit & Mayer, Ltd.

(57) ABSTRACT

An electrical multiple distributor includes a housing having a modular design and including an inner housing. At least one clamping device is disposed on the housing and is configured to contact a shielded line of at least one cable outlet so as to connect the at least one cable outlet. At least one receiving contour is disposed at a connection position and is configured to accommodate a connecting sleeve so as to connect at least one connector. An electromagnetic shielding device is disposed on the housing, and a protective device is disposed on the housing and is configured to protect against at least one of moisture and dust. At least two electrical connections are disposed in the housing, and at least one distribution system is disposed in the housing and is configured to selectively interconnect the at least two electrical connections, the at least one distribution system being positionable by the inner housing.

15 Claims, 4 Drawing Sheets

ELECTRIC MULTIPLE DISTRIBUTOR

CROSS REFERENCE TO PRIOR APPLICATIONS

This application is a U.S. National Phase Application under 35 U.S.C. §371 of International Application No. PCT/EP2009/008385, filed on Nov. 25, 2009, which claims benefit to German Application No. DE 10 2008 059 477.6, filed on Nov. 28, 2008. The International Application was published in German on Jun. 3, 2010 as WO 2010/060608 under PCT Article 21 (2).

FIELD

The present invention relates to an electrical multiple distributor with electrical connections for distributing and transmitting electrical signals, data and the like.

BACKGROUND

Various electrical multiple distributors are described in the related art. Electrical multiple distributors are provided for different fields of application. Such electrical multiple distributors often include a housing that has the designated number of electrical connections. The wires or electrical lines provided in the interior of the housing for connecting the individual connections are frequently extrusion-coated with an insulating material to protect against moisture. In some instances, an external housing shell may be provided that is electrically conductive in order to provide an EMC shielding for the electrical multiple distributor.

Depending on the particular application, different housings are provided for connecting individual cable outlets, cables or electrical connectors. This requires stocking a large number of different housings for the various applications. Moreover, design variants with and without EMC shielding are needed.

SUMMARY

In an embodiment, the present invention provides an electrical multiple distributor. The distributor includes a housing having a modular design and including an inner housing. At least one clamping device is disposed on the housing and is configured to contact a shielded line of at least one cable outlet so as to connect the at least one cable outlet. At least one receiving contour is disposed at a connection position and is configured to accommodate a connecting sleeve so as to connect at least one connector. An electromagnetic shielding device is disposed on the housing, and a protective device is disposed on the housing and is configured to protect against at least one of moisture and dust. At least two electrical connections are disposed in the housing, and at least one distribution system is disposed in the housing and is configured to selectively interconnect the at least two electrical connections, the at least one distribution system being positionable by the inner housing.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
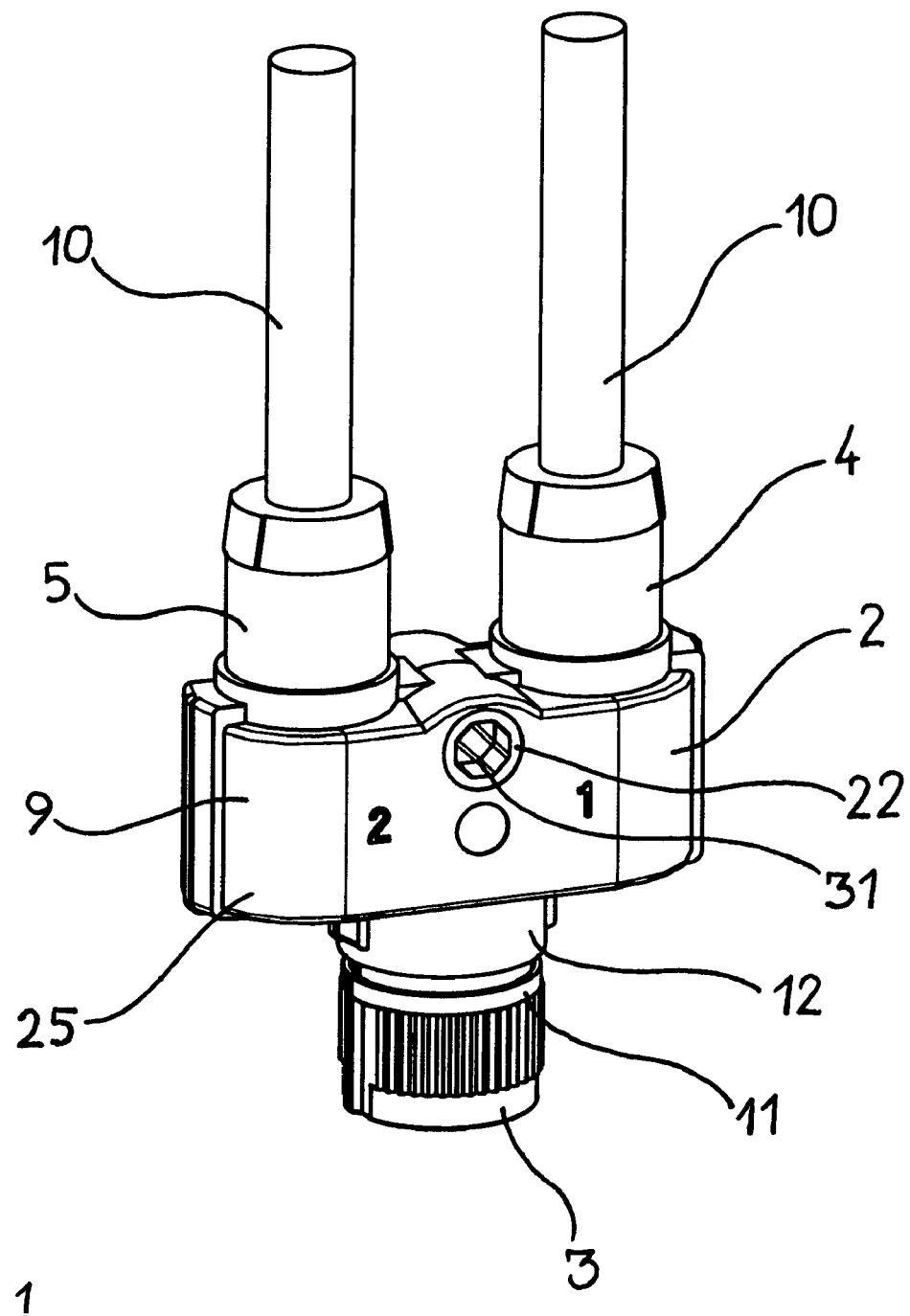
FIG. 1 a perspective overall view of an electrical multiple distributor according an embodiment.

In an embodiment, the present invention provides an electrical multiple distributor that has a flexible use and that is suited for connecting cable outlets and connectors, an EMC shielding being optionally possible.

In an embodiment, the present invention provides an electrical multiple distributor having two, three, four or more electrical connections for distributing and transmitting electrical signals, data and the like in a targeted manner to the corresponding connections.

The electrical multiple distributor according to an embodiment of the present invention includes a housing having at least two and, in particular at least three electrical connections and at least one distribution system in the housing which make it possible to selectively interconnect the electrical connections. In this context, an inner housing of the housing may be used for positioning the distribution system, and an electromagnetic shielding device, as well as a device for protecting against moisture and/or dust are provided on the housing. The housing has a modular design and is designed for optionally connecting at least one shielded cable or cable outlet and for connecting at least one connector. To this end, at least one receiving contour for accommodating a connecting sleeve is provided at the connection positions of the electrical connections, and at least one clamping device for contacting a shielded line of a cable is provided on the housing.

The electrical multiple distributor according to an embodiment of the present invention has many advantages. One advantage of the electrical multiple distributor according to an embodiment is its modularity which makes it possible to optionally connect cables, cable outlets or connectors to the housing. Thus, it is possible to connect either three cables, cable outlets or also three electrical connectors to a triple multiple distributor. The same housing may be used in each case, making it possible to reduce the number of parts that need to be stored, thereby lowering storage and production costs.

Another advantage is that the connected electrical lines may be optionally shielded. The housing of the electrical multiple distributor according to an embodiment is generally provided with an electromagnetic shielding device, making possible a shielded connection to the housing, both for cables or cable outlets to be connected, as well as for connectors to be connected. To this end, the housing has a receiving contour for contacting a connecting sleeve, and a clamping device is provided for electrically contacting a shielded line of a cable. An especially flexible use of the electrical multiple distributor is thereby made possible.

The multiple distributor may be provided in a broad array of shapes. A Y shape or a T shape is possible, for example. Also preferred are an H shape, a U shape and an X shape. Any given other designs of the housing and orientations of the electrical connections are also possible.

The distribution system preferably includes at least one circuit board that is designed, in particular, to be fixed, but may also have a flexible design. The circuit board is connected to the individual electrical connections, so that the circuit board selectively interconnects individual current, respectively signal lines.

At least one electrical component, which is used for processing or for displaying signals or states of the electrical multiple distributor, may be advantageously connected to the circuit board. Also possible, however, is the use of other electrical components.

In an embodiment, the housing is composed, in particular, of two identical housing sections which are preferably symmetrical in design. This facilitates manufacturing, since merely one mold form is needed during production.

Preferably, at least one housing section features at least one bore or insertion opening, and at least one housing section features at least one coupling pin to facilitate interlocking of the housing sections. It is preferred that each housing section have at least one bore and at least one coupling pin.

In an embodiment, EMC shielding is ensured by the shielding device of the housing that may be made of a metal. It is likewise possible and preferred that the housing be made of a plastic that is provided with a conductive coating in order to attain the necessary electrical conductivity for the EMC shielding. Such a coating is preferably provided on the interior side of the housing in order to effect an outward insulation.

In an embodiment, the device for protecting against moisture and/or dust is formed by extrusion coating the distribution system with plastic, synthetic resin or a bonding agent or the like. In this context, the inner housing is used for positioning the distribution system, respectively the circuit board in the housing. The interior space of the housing is subsequently injected with plastic or another suitable material, to ensure that the electrical connections accommodated in the housing retain their moisture protection.

To position the circuit board, the inner housing preferably has at least one receiving groove for receiving the same, whose dimensions allow the circuit board to be accommodated, in particular, with some play. For example, the inner housing may be formed by crosspieces in the housing sections in which the receiving groove is formed for receiving and positioning the circuit board. Thus, when the electrical multiple distributor is to be assembled, a circuit board may be introduced into the grooved crosspiece of the inner housing. Subsequently thereto, the second housing section may be fitted onto the first housing section, whereby the circuit board is accommodated by the crosspieces of the inner housing. When the interior space of the housing is subsequently injected, a substantially immovable position of the circuit board is accomplished by the inner housing, so that defined distances of the circuit board from the outer edges of the housing are provided. Under the related art, an injection process often leads to circuit board displacements, so that distances to the outer edges that are required from an electrical standpoint, are no longer observed.

In an embodiment, at least two mutually spaced apart coupling pins are provided in at least one receiving groove to hold the circuit board on the receiving groove in a defined manner and to ensure that only small areas of the circuit board contact the inner housing, respectively the housing. This significantly reduces the possibility of creepage of any ingressing moisture. When moisture enters into the housing that is filled with a plastic or the like, this mostly occurs along the boundary surfaces of the filling plastic and the housing. A point-by-point seating of the circuit board on the inner housing limits any such moisture creepage to a very small amount since only a few small contact points are provided, and the circuit board does not rest over its complete length against the inner housing.

The housing is preferably provided with an opening for passing through a fastening means to enable the housing to be secured to another component, such as to a machine, for example. The opening in the housing is provided as a polygonal opening, in particular, to permit a form-locking engagement with a suitable mating component. Such a polygonal opening may also be used, in particular, during the injection molding process to hold the housing in a defined manner in the injection molding system.

At least one status indicator functioning as a connection indicator, a signal indicator, and/or as a circuit indicator, for example, may be provided on the electrical multiple distributor. At least one status of the electrical multiple distributor may be indicated in this manner. In particular, an optical status indicator is provided that is preferably designed as an LED. An opening to the outside is then preferably provided in the housing for the status indicator to obtain a status indicator signal that is optically visible on the outside. To prevent the ingress of moisture, an at least partially transparent injection molding material may be used at least in the area of the opening for the status indicator.

Preferably, the receiving contour includes a peripherally extending contour nose or a peripherally extending contour groove for receiving a connecting sleeve in a defined manner. Such a connecting sleeve may be a component of a plug or of a socket, for specifically connecting connectors to electrical multiple distributors.

The cylindrically shaped receiving contour may feature at least one press nose to enable the receiving contour to be pressed together with a connecting sleeve to be received. The receiving contour is designed, in particular, to be electrically conductive in order to provide a reliable electrical contact between the connecting sleeve and the housing of the electrical multiple distributor. This makes it possible to connect the shielding of a connector to be connected or the shielding of a cable to be connected to such a connecting sleeve in order to ensure a continuous and complete EMC shielding.

In the case of cables to be connected, such a connecting sleeve may be slid over the cable end prior to assembly and be connected to the shielding or shield strand prior to assembly in order to ensure a suitable shielding.

It is also possible and, in terms of modularity, preferable, however, that the shield strand or the shielding of a cable to be connected be introduced into the housing and be contacted there by a clamping device and be connected to the electrically conductive housing to ensure the necessary shielding of the housing. To this end, the braided shield may be pressed by the housing halves.

Overall, therefore, the present invention provides an electrical multiple distributor, whereby an EMC shielding is provided by a conductive housing that is filled with a plastic or the like to protect against the ingress of moisture and water, thereby achieving an IP67 protection.

A flexible use is made possible by the capability to connect electrical connectors designed as plugs or sockets and to connect unshielded or shielded cables. The contacting of the shielding of a connector or of a cable to be connected may be accomplished via a conductive connecting sleeve, respectively shielding sleeve. The shielding of a cable may also be made possible by a contacting of the shield strand or of the electrical shielding of the cable by a clamping connection on the housing.

In its interior, the housing has space for a circuit board, which may be populated with additional components, such as resistors, optocouplers, LEDs, etc. Overall, therefore, a great diversity of variants may be realized at low cost and with little complexity.

On the whole, the present invention provides a simple electrical multiple distributor that is suited for a flexible use.

An exemplary embodiment of an electrical multiple distributor according to the present invention is described in the following with reference to FIG. 1-4, electrical multiple distributor 1 in FIG. 1 being shown in a perspective view.

Here, the electrical multiple distributor has three electrical connections 3, 4 and 5 on a housing 2 which encompasses two symmetrical housing sections 21 and 22.

In the exemplary embodiment, electrical multiple distributor 1 is designed as a Y distributor, but may also have other housing shapes and connection capabilities. A T shape or H shape for four electrical connections is only mentioned exemplarily. Five, six or more electrical connections may also be configured.

In the representation in accordance with FIG. 1, a connector 11 is provided at the bottom end of electrical multiple distributor 1 at connection position 12. Connector 11 is provided here as a socket to which a corresponding electrical plug is connectable. Conversely, it is also possible to equip connector 11 as a plug to facilitate connection of a corresponding socket.

The two other electrical connections four and five, which are provided here on the top housing side in the representation in accordance with FIG. 1, are designed as cable outlets 10, which, during assembly of housing 2, are connected thereto in the same way as electrical connector 11.

On the top side of housing section 22 visible here, an opening 31 is configured as a polygonal opening that extends through complete housing 2. This enables housing 2 to be mounted on a machine or the like, for which purpose a screw is inserted through opening 31 and tightened onto the machine. When assembling and manufacturing electrical multiple distributor 1, opening 31 is used for fixing inner housing 21 and 22 in place in the injection molding machine to ensure a defined position of the housing.

Figure 2:
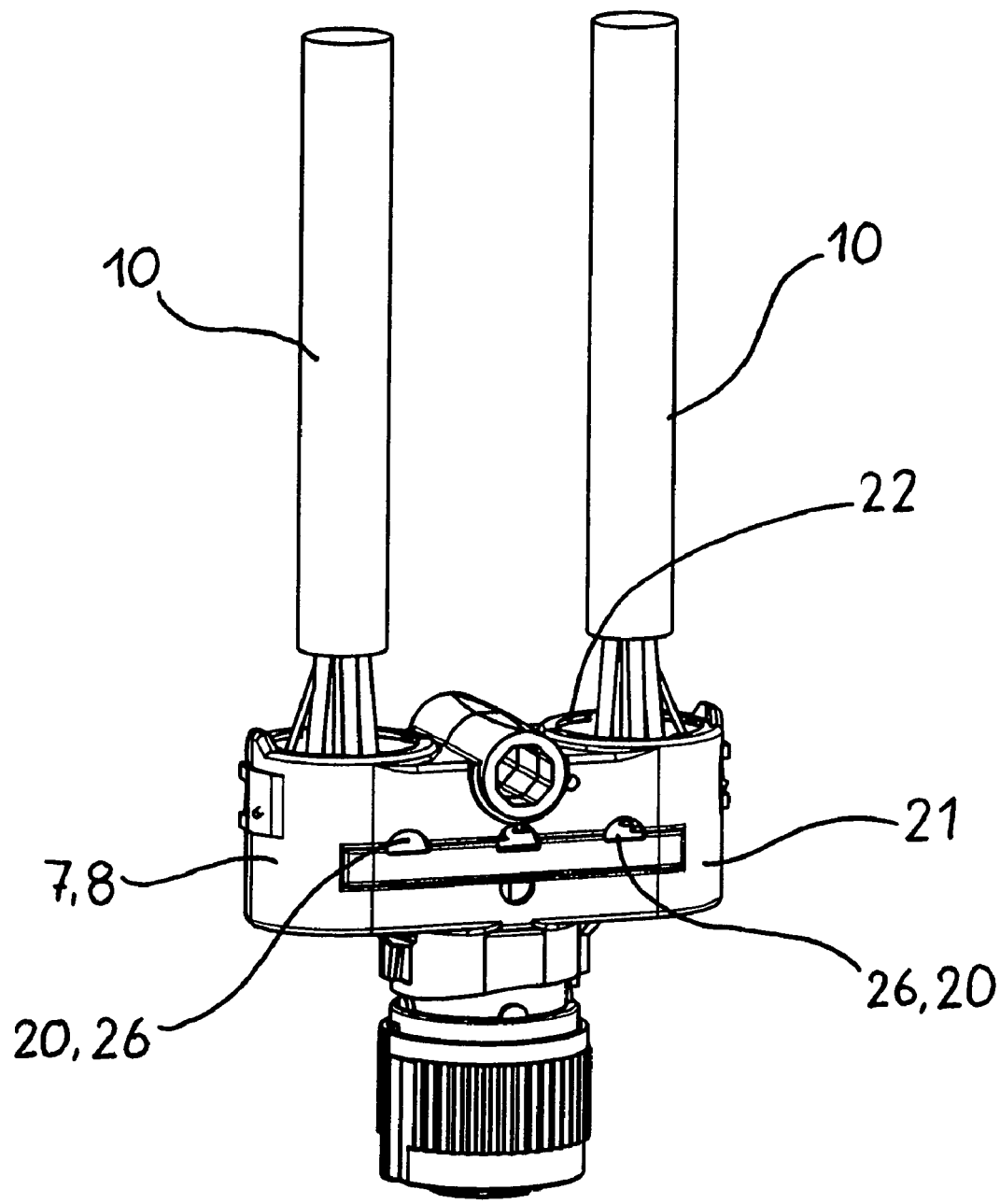
FIG. 2 a perspective overall view of the electrical multiple distributor according to FIG. 1 without an outer extrusion coating.

Electrical multiple distributor 1 is depicted in FIG. 2 without an outer extrusion coating. Clearly discernible are cable outlets 10, in the case of which the individual conductors or strands are connected to corresponding connections on housing 2. Shielded line 18 (also compare FIG. 3) is connected to housing 2 separately from the other conductors. The two interconnected housing sections 21 and 22 have a conductive design, or a conductive coating is provided to ensure a reliable shielding. Likewise clearly discernible are electrical components 20 used as status indicators 26, which are accommodated on inner housing 21, 22, respectively on the housing sections and which indicate the particular circuit or connection state of electrical multiple distributor 1.

In the case of the injection molding process, the opening, in which status indicator 26 is visibly configured as electrical component 20, is used for introducing at least a plastic 25 or bonding agent or the like. A transparent plastic is used to seal the opening at least in the upper region above status indicator 26, so that optical status indicator 26 is visible from the outside.

Figure 3:
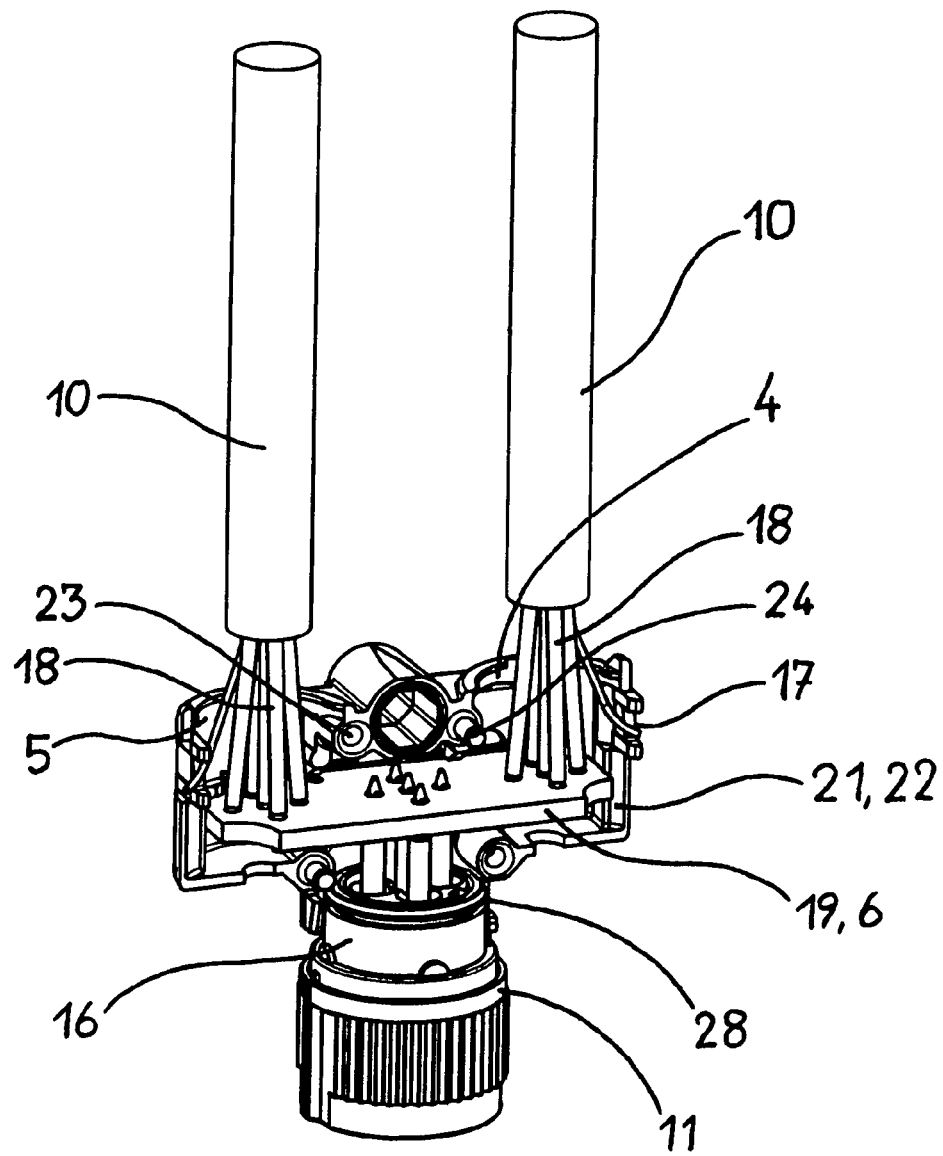
FIG. 3 the electrical multiple distributor from FIG. 1 showing an open inner housing.

In a perspective representation, FIG. 3 shows connector 1 including open housing 2, thereby providing a view into housing section 21.

Clearly discernible in the representation in accordance with FIG. 3 is distribution system 6, which is designed as circuit board 19. Circuit board 19 is accommodated on inner housing 21 of housing 2 in a defined manner. Connector 11, respectively the contacts thereof are soldered here to circuit board 19. In other embodiments, it is also possible that the contacts of connector 11 or that cable outlet 10 are/is fixedly clamped or tightened to the circuit board, or that the corresponding conductors are otherwise connected to the corresponding contacts on the circuit board.

In the same way as housing section 22, housing section 21 has two bores 23 and corresponding coupling pins 24, which are symmetrically configured in such a way that when the two housing sections 21 and 22 are closed, coupling pins 24 each lock into bores 23.

When a cable outlet 10 is connected to circuit board 19, it is introduced into housing 1 at one of electrical connections 4 or 5, and the conductors contained in the cable outlet are soldered to circuit board 19, for example, to establish a suitable electrical connection.

On its outer circumference, connector 11 has a contour groove 28 which cooperates with receiving contour 15 in housing 2 to render possible a fixed mechanical connection of connecting sleeve 16 to housing 2. Together with contour groove 28, the receiving contour, which is formed as a peripherally extending contour nose 27, provides a fixed axial mounting of connecting sleeve 16, which is thus secured against axial displacement and is also able to absorb bending forces.

Figure 4:
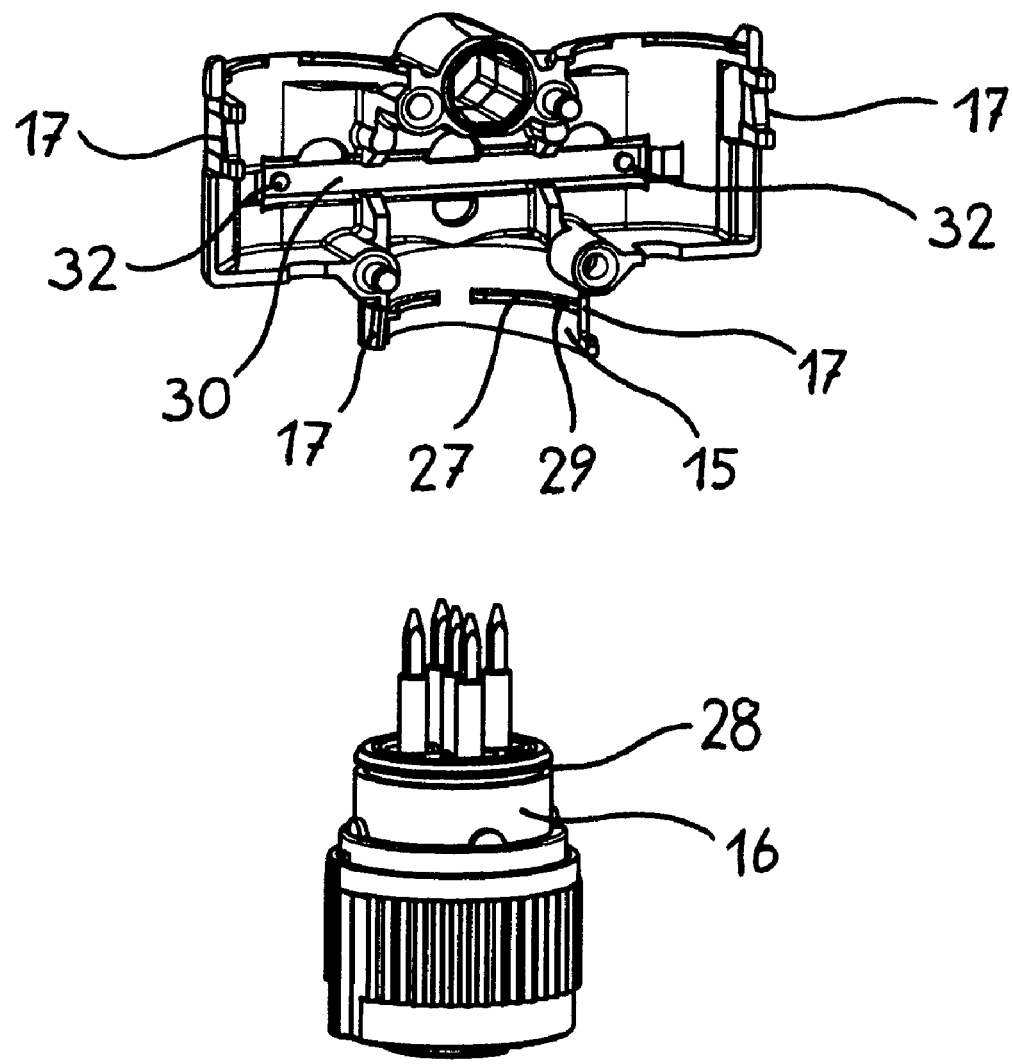
FIG. 4 a housing section of the electrical multiple distributor from FIG. 1, prior to assembly, and including an attachable connector.

The structure of the housing is clearly recognizable in FIG. 4, since only housing section 21 and an attachable connector are shown there in a perspective representation. Housing section 22 has an identical design and is pressed together with housing section 21 during assembly.

Inner housing 21 of housing 2 has a receiving groove 30 in which two coupling pins 32 are configured here. Circuit board 19 is introduced into groove 30 during assembly and is held with some play by this groove 30, so that a defined position of circuit board 19 in housing 2 is obtained. Undefined positions, as occur in the related art after the plastic is poured in, are reliably prevented in this manner.

To minimize the danger of a potential ingress of moisture and to increase the necessary creepage distance, coupling pins 32 are provided in groove 30. Circuit board 19 rests on housing section 21 via coupling pins 32, while groove 30 is filled by the pouring of a plastic or resin.

In this case, contour nose 27 of receiving contour 15 has one or two press noses 29 which are used for pressing in a connecting sleeve 16 at the receiving contour. A reliable electrical contact is thereby provided between receiving contour 15, and thus in housing 2, and connecting sleeve 16 formed from an electrically conductive material, so that a continuous shielding is made possible from connecting sleeve 16 over entire housing 21 and 22.

Sketched here only schematically is a shielded line 18 of a cable outlet 10, which is introduced here into housing 2 at electrical connection 5 and, from there, is laid over to the side where it is clamped by clamping device 17 upon closing of the housing. For this purpose, housing sections 21 and 22 have correspondingly formed clamping elements at both ends that lock together accordingly upon closing of the housing and effectively contact a shield strand accommodated therebetween.

Overall, therefore, an electrical multiple distributor 1 is provided which, independently of the connection of cable outlets 10 or connectors 11, effectively permits a possible shielding of connectors 11 and cable outlets 2 to be connected, through the use of a housing 21 and 22 which is at least conductive on the inner side. In the case that a connecting sleeve 16 is slipped onto cable outlet when cable outlets 10 are connected, a completely gap-free shielding of connectors 11 to be connected, as well as of cable outlets 10 to be connected is ensured.

Since housing 2 is filled with a plastic 25 or a bonding agent or resin following the connection of the corresponding contacts to circuit board 19 and the introduction of circuit board 19 and the sealing of housing sections 21 and 22, electrical multiple distributor 1 constitutes a system that is effectively protected against the ingress of dust and moisture.

Its simple design makes it possible for the same housing 2 to be used for a broad array of electrical multiple distributors, so that advantages are derived in terms of manufacturing and warehousing.

While the invention has been described with reference to particular embodiments thereof, it will be understood by those having ordinary skill the art that various changes may be made therein without departing from the scope and spirit of the invention. Further, the present invention is not limited to the embodiments described herein; reference should be had to the appended claims.

Reference Numeral List
1 electrical multiple distributor
2 housing
3 electrical connection
4 electrical connection
5 electrical connection
6 distribution system
7 inner housing
8 shielding device
9 protective device
10 cable outlet
11 connector
12 connection position
13 connection position
14 connection position
15 receiving contour
16 connecting sleeve
17 clamping device
18 shielded line
19 circuit board
20 electrical component
21 housing section
22 housing section
23 bore
24 coupling pin
25 plastic
26 status indicator
27 contour nose
28 contour groove
29 press nose
30 receiving groove
31 opening
32 coupling pins.

The invention claimed is:

1. An electrical multiple distributor comprising:
a housing having a modular design and including an inner housing;
at least one clamping device disposed on the housing and configured to contact a shielded line of at least one cable outlet so as to connect the at least one cable outlet;
at least one receiving contour disposed at a connection position and configured to accommodate a connecting sleeve so as to connect at least one connector;
an electromagnetic shielding device disposed on the housing;
a protective device disposed on the housing and configured to protect against at least one of moisture and dust;
at least two electrical connections disposed in the housing; and
at least one distribution system disposed in the housing and configured to selectively interconnect the at least two electrical connections, the at least one distribution system being positionable by the inner housing.

2. The multiple distributor as recited in claim 1, wherein the distribution system includes at least one circuit board.

3. The multiple distributor as recited in claim 2, wherein at least one electrical component is connected to the at least one circuit board.

4. The multiple distributor as recited in claim 2, wherein the inner housing includes at least one receiving groove having receiving groove dimensions configured to accommodate, with play, the at least one circuit board.

5. The multiple distributor as recited in claim 4, wherein the at least one receiving groove includes at least two mutually spaced apart coupling pins configured to hold the circuit hoard in the at least one receiving groove in a predetermined position.

6. The multiple distributor as recited in claim 4, wherein the receiving contour includes at least one of a peripherally extending contour nose and a contour groove.

7. The multiple distributor as recited in claim 4, wherein the receiving contour has a cylindrical form and at least one press nose configured to receive the connecting sleeve.

8. The multiple distributor as recited in claim 1, wherein the housing includes a first housing section and a second housing section.

9. The multiple distributor as recited in claim 8, wherein the first and the second housing sections are identical.

10. The multiple distributor as recited in claim 8, wherein at least one of the first housing section and the second housing section includes at least one bore and at least one of the first housing section and the second housing section includes at least one coupling pin, the at least one bore and the at least one coupling pin being configured to interlock the first and the second housing sections.

11. The multiple distributor as recited in claim 1, wherein the shielding device includes at least one of a metal and a plastic having a conductive coating.

12. The multiple distributor as recited in claim 1, wherein the protective device includes an extrusion coating of at least one of a plastic, a synthetic resin and a bonding agent.

13. The multiple distributor as recited in claim 12, wherein the status indicator is at least one of a connection indicator, a signal indicator and a circuit indicator.

14. The multiple distributor as recited in claim 1, wherein the housing includes an opening configured to receive a fastening device so as to secure the housing to another component.

15. The multiple distributor as recited in claim 1, further comprising at least one status indicator.

* * * * *